United States Patent [19]

Wrue

[11] 3,832,920
[45] Sept. 3, 1974

[54] APPARATUS FOR AND METHOD OF EDGING A NON-RIGID LENS

[75] Inventor: Richard J. Wrue, Rochester, N.Y.

[73] Assignee: Bausch & Lomb Incorporated, Rochester, N.Y.

[22] Filed: July 13, 1972

[21] Appl. No.: 271,431

[52] U.S. Cl. .................................................... 82/20
[51] Int. Cl. ............................................. B23b 5/00
[58] Field of Search ................................... 82/11, 20

[56] References Cited
UNITED STATES PATENTS

| | | | |
|---|---|---|---|
| 679,540 | 7/1901 | Packer | 82/20 |
| 1,689,219 | 10/1928 | Albee | 82/20 |
| 2,522,315 | 9/1950 | Staat | 82/20 |
| 2,582,279 | 1/1952 | Reimschissel | 82/20 X |
| 2,598,656 | 5/1952 | Bastian et al. | 82/20 X |
| 3,099,929 | 8/1963 | Lindemann | 82/20 |

Primary Examiner—Harrison L. Hinson
Attorney, Agent, or Firm—Frank C. Parker; Bernard D. Bogdon; DeWitt M. Morgan

[57] ABSTRACT

Apparatus for and method of edging a lens while it is firmly supported or secured in a mold. When unsupported the lens is non-rigid. The preferred embodiment includes a rotatable shaft supported at one end by an electric motor and carrying a knife or cutter at its unsupported free end. Slidably supported on the free end of the shaft is a chuck housing including a sleeve portion and a holder or chuck portion. The chuck portion is dimensioned to receive the end of a lens mold containing the lens cavity so as to position the peripheral edge of the lens and the adjoining face of the mold opposite the rotating knife. A suitable source of vacuum is coupled to the chuck housing adjacent the chuck portion to remove chips generated in the cutting operation. The vacuum may also be used to hold the lens and mold assembly in place. Movement of the chuck portion towards the cutter results in the removal of a portion of the peripheral edge of the supported lens and a corresponding amount of the face of the lens mold.

3 Claims, 4 Drawing Figures

PATENTED SEP 3 1974           3,832,920

APPARATUS FOR AND METHOD OF EDGING A NON-RIGID LENS

BACKGROUND OF THE INVENTION a. Field of the Invention:

This invention relates to a ophthalmic lens edge contouring machine and more particularly to an apparatus for moving such a lens while firmly supported in or secured to the lens mold, into a rotating cutter to remove a portion of the edge of the lens. The lens in an unsupported state is flexible or non-rigid.

b. Description of the Prior Art

Early methods in the flexible ophthalmic lens manufacturing industry included hand finishing of the non-rigid contact lenses. This proved time consuming and expensive and hence entirely unsatisfactory for mass production.

U.S. Pat. No. 3,423,886 entitled "Method of Machining Non-Rigid Contact Lenses" issued to F. Schpak et al is directed to edge contouring of non-rigid lenses of silicone rubber composition. In this patent lens centering problems are not resolved and the contact lenses are rotated at relatively high speed to prestress the peripheral edge portion sufficiently so as to be stress neutralized when engaged by a forming element during a machining operation.

Attention is also directed to U.S. Pat. No. 3,736,183 for "Apparatus For and Method of Edge Machining Flexible Contact Lenses". While the method disclosed therein was a great improvement over prior art techniques it was time consuming from a mass production standpoint due to the number of handling steps required.

SUMMARY OF THE INVENTION

This invention provides novel apparatus for edge contouring a lens while it is secured in its associated mold; the lens when unsupported being non-rigid. The lens and lens mold assembly is supported by a chuck or holder in such a manner that the peripheral edge of the lens and the adjacent face of the lens mold are positioned opposite a rotating cutter or knife. Movement of the chuck or holder portion towards the cutter results in the removal of a portion of the edge of the lens and a corresponding portion of the face of the mold.

It is, accordingly, an object of this invention to provide novel apparatus for edging a otherwise non-rigid lens while secured in its lens mold. Other objects, advantages and details of such apparatus appear in the following detailed description of the invention.

DETAILED DESCRIPTION OF THE PREFERRED EMBODIMENT

The illustrated flexible lens knife edger apparatus includes an edger assembly 11 secured to the shaft 15 of a motor 13. The motor 13 and plate 14 constitute the base or support structure for shaft 15.

Figure 1:
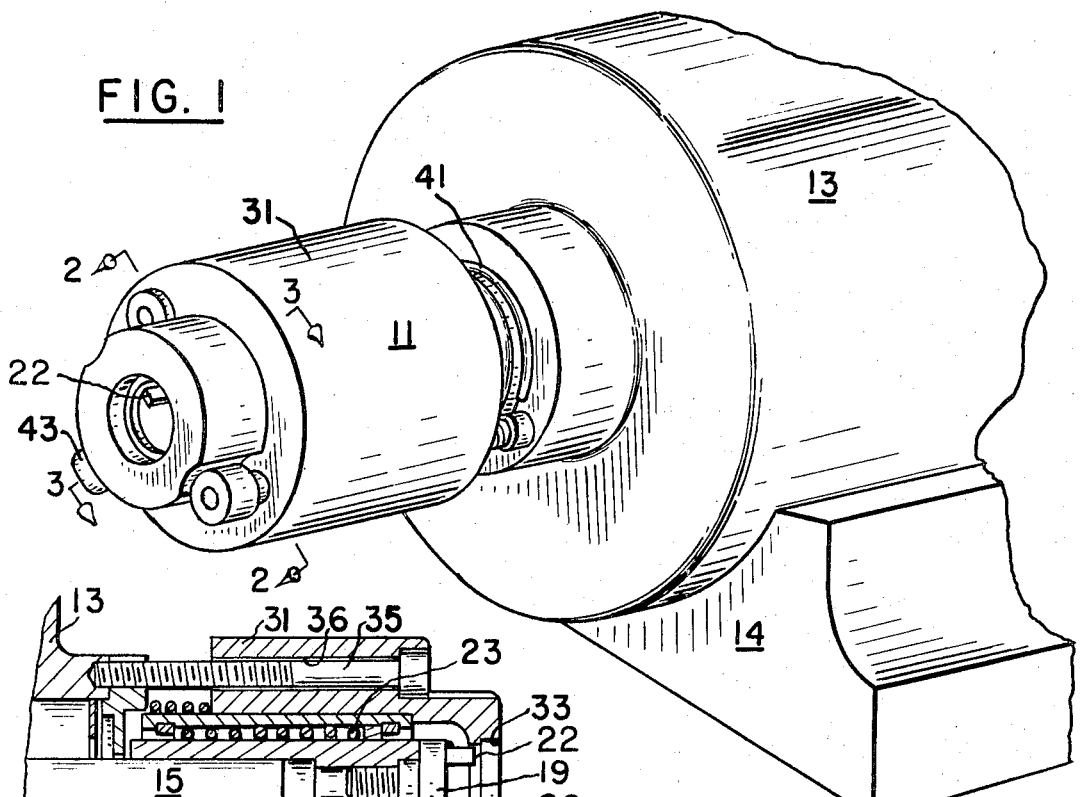
FIG. 1 illustrates a perspective view of a preferred embodiment of the flexible lens knife edger apparatus.
Figure 2:
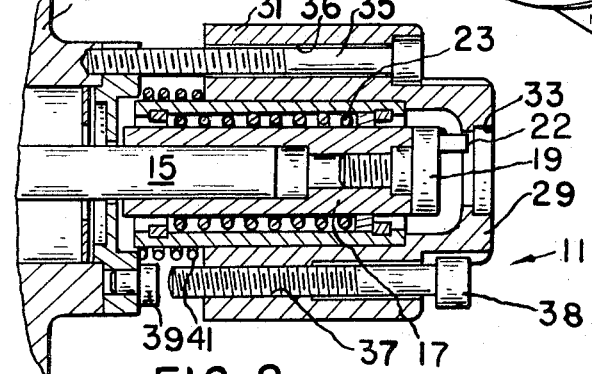
FIG. 2 is a sectional view of the knife edger assembly taken along line 2—2 of FIG. 1.

The rotating shaft 15 is illustrated in FIG. 2. It should be noted, however, that any suitable rotatably supported shaft and drive mechanism may be substituted for shaft 15 and motor 13.

Secured, such as by press fitting, to the free end of shaft 15 is sleeve 17 which supports cutter mount 19 at its right hand end as viewed in FIG. 2. The cutter mount 19 supports knife or cutter 21 on its free end. Cutter 21, which may be made of carbide is secured to the cutter mount 19 at a location that is radially offset from the longitudinal axis of shaft 15 such that cutting edge 22 is disposed in a plane which is perpendicular to the aforesaid longitudinal axis.

Also supported on sleeve 17 is a linear-rotary ball bearing 23 which, in turn, supports a chuck housing, generally designated 29. Chuck housing 29 consists of a sleeve portion 31 and a chuck or holder portion 33. As is evident from inspection of the drawings chuck portion 33 takes the form of a circular opening having an internal shoulder 34 the face of which lies in a plane which is perpendicular to the axis of chuck 29. The linear-rotary ball bearing 23 is received within sleeve portion 31 to align the axis of chuck 29 with the longitudinal axis of rotary shaft 15 which, in turn, permits reciprocal movement of sleeve portion 31 along the coincident axes. Movement of sleeve portion 31 in a right hand direction, again as viewed in FIG. 2, is limited by the head of screw 35 which passes through an aperture 36 in sleeve portion 31 and is secured in a suitably located threaded opening in the housing of motor 13. Screw 35 also prevents rotation of chuck housing 29.

Sleeve portion 31 of chuck housing 29 is also provided with a threaded bore 37 which receives stop screw 38. The left hand end of stop screw 38 is aligned with stop button 39 supported on the housing of motor 13.

Compression spring 41 supported between the housing of motor 13 and the left hand end of sleeve portion 31 biases the chuck housing 29 to the right against the head of screw 35. Since engagement of stop screw 38 with stop button 39 limits the leftward movement as viewed in FIG. 2 of chuck housing 29 it will be apparent that the spacing between stop button 39 and the end of stop screw 38 determines the extent of reciprocal movement of chuck housing 29.

Figure 3:
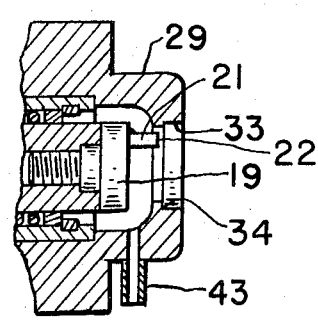
FIG. 3 is a partial sectional view of the knife edger assembly taken along line 3—3 of FIG. 1.
Figure 4:
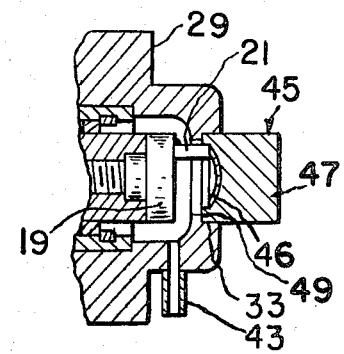
FIG. 4 is a partial sectional view similar to FIG. 3 showing the cutter in engagement with a flexible lens and mold assembly.

As can be seen from examination of FIGS. 3 and 4 the right hand end of chuck housing 29 is provided with a conduit 43 which is connected to a suitable source of vacuum, such as a shop vacuum cleaner (not shown), to remove chips generated in the cutting operation.

The lens and mold assembly 45 includes lens 46 secured or firmly supported in lens mold 47. Lens 46 has an edge which is adjacent lens mold face 49. Since lens 46 is preferably of hydrophilic hydrogel material it will be appreciated that it is non-rigid when in its hydrated state. However, while in mold 47 lens 46 is maintained in an anhydrous condition. Lens mold 47 is preferably made of material which facilitates the cutting step described below.

In operation an operator inserts the lens and lens mold assembly 45 into chuck portion 33 of chuck housing 29. The complementary diameters of chuck portion 33 and lens mold 47 (as illustrated in FIG. 4) coupled with the aforesaid source of vacuum (supplied via conduit 43) holds surface 49 firmly and squarely against shoulder 34. In this position the lens and mold assembly 45 is substantially symmetrical with respect to the longitudinal axis of shaft 15. The operator then moves chuck housing 29 to the left as viewed in FIG. 2 forcing the face 49 of assembly 45 into the rotating cutter 21 as is shown in FIG. 4. Cutter 21 making an annular circular cut of predetermined depth removes a small amount from the peripheral edge of the lens and a corresponding amount of the face of the lens mold. The removed material is drawn off through conduit 43. The depth of the cut being regulated by the setting of stop screw 38.

Although a preferred embodiment of this invention is illustrated, it is to be understood that various modifications and rearrangements of parts may be inserted to without departing from the scope of the invention disclosed.

I claim:

1. Apparatus for edge contouring a lens while it is secured in a mold, said mold having a face, said lens having an edge which is adjacent said face, said lens and mold constituting an assembly, said apparatus comprising:
   a. base means;
   b. rotatable cutter supporting means, said cutter supporting means having a longitudinal axis and a free end, said cutter supporting means being secured to said base means for rotation about said longitudinal axis;
   c. a cutter secured to said free end of said cutter supporting means, said cutter including a cutting edge which is radially offset from said longitudinal axis and lies in a plane which is perpendicular to said longitudinal axis;
   d. chuck means, said chuck means having an axis and including means for securing said lens and mold assembly such that said lens and mold assembly is substantially symmetrical with respect to said chuck axis and said face of said mold lies in a plane that is fixed relative to said chuck means and is perpendicular to said chuck axis; and
   e. means secured relative to said base means for permitting relative linear movement between said cutter and said chuck means between a first position wherein said face of said mold and said adjacent edge are spaced from said cutting edge to a second position wherein said cutting edge engages said face of said mold and said adjacent edge to thereby remove a portion of said face of said mold and a portion of said adjacent edge.

2. Apparatus for edge contouring a lens while it is secured in a mold, said mold having a face, said lens having an edge which is adjacent said face, said lens and mold constituting an assembly, said apparatus comprising:
   a. support structure;
   b. rotatable cutter supporting means, said cutter supporting means having a longitudinal axis and a free end, said cutter supporting means being secured to said support structure for rotation about said longitudinal axis;
   c. a cutter secured to the free end of said cutter supporting means, said cutter including a cutting edge which is radially offset from said longitudinal axis and lies in a plane which is perpendicular to said longitudinal axis;
   d. chuck means, said chuck means having an axis and including means for securing said lens and mold assembly such that said lens and mold assembly is substantially symmetrical with respect to said chuck axis and said face of said mold lies in a plane fixed relative to said chuck means and perpendicular to said chuck axis; and
   e. means, secured between said rotatable cutter supporting means and said chuck means, for substantially aligning said chuck axis with said longitudinal axis and permitting reciprocal movement of said chuck means relative to said cutter supporting means along said substantially aligned axes between a first position wherein said face of said mold and said adjacent edge are spaced from said cutting edge to a second position wherein said cutting edge engages said face of said mold and said adjacent edge to thereby remove a portion of said face of said mold and a portion of said adjacent edge.

3. The apparatus as set forth in claim 2 further including biasing means and adjustable stop means both secured between said support structure and said chuck means, said biasing means yieldably maintaining said chuck means in said first position, the setting of said stop means determining said second position.

* * * * *